(12) United States Patent
Paetzold

(10) Patent No.: US 7,158,855 B2
(45) Date of Patent: Jan. 2, 2007

(54) TWO-DIMENSIONAL DEPICTION OF COMPONENTS OF A FILM EXTRUSION SYSTEM ON AN OUTPUT DEVICE

(75) Inventor: Reinhard Paetzold, Osnabrueck (DE)

(73) Assignee: Windmoeller & Hoelscher KG, Lengerich (DE)

( * ) Notice: Subject to any disclaimer, the term of this patent is extended or adjusted under 35 U.S.C. 154(b) by 36 days.

(21) Appl. No.: 10/528,801

(22) PCT Filed: Aug. 28, 2003

(86) PCT No.: PCT/EP03/09632

§ 371 (c)(1),
(2), (4) Date: Mar. 23, 2005

(87) PCT Pub. No.: WO2004/033185

PCT Pub. Date: Apr. 22, 2004

(65) Prior Publication Data

US 2006/0047359 A1    Mar. 2, 2006

(30) Foreign Application Priority Data

Sep. 25, 2002  (DE) ................................ 102 44 869

(51) Int. Cl.
*G06F 19/00* (2006.01)
(52) U.S. Cl. ..................................................... 700/204
(58) Field of Classification Search ................ 700/197, 700/198, 200, 201, 204
See application file for complete search history.

(56) References Cited

U.S. PATENT DOCUMENTS

| 4,130,453 A | * | 12/1978 | Hollister ...................... 156/187 |
| 4,425,290 A | * | 1/1984 | Upmeier ..................... 264/40.1 |
| 4,426,239 A | * | 1/1984 | Upmeier ....................... 156/64 |
| 5,288,219 A | * | 2/1994 | Smith ......................... 425/72.1 |
| 6,241,502 B1 | | 6/2001 | Baeumer et al. ............ 425/72.1 |
| 6,251,995 B1 | * | 6/2001 | Hesse et al. ................ 525/191 |

FOREIGN PATENT DOCUMENTS

| EP | 0 813 169 A2 | 12/1997 |
| EP | 0 873 846 A2 | 10/1998 |
| JP | 2 15308 | 1/1990 |

* cited by examiner

*Primary Examiner*—Leo Picard
*Assistant Examiner*—Chad Rapp
(74) *Attorney, Agent, or Firm*—Jacobson Holman PLLC

(57) ABSTRACT

An operating panel for a film extrusion plant displays the spatial relationship of operating elements of the plant relative both to each other and to an operator viewing the display. The panel has a terminal for inputting functional parameters of the operating elements, such as an extruder, a film bubble, a nozzle, a blowing head, a winding section, or a resin hopper or dosimetry unit associated with the extruder. The panel has an indicator that displays both the parameters and an at least two-dimensional view of the spatial relationship of the operating elements.

15 Claims, 3 Drawing Sheets

TWO-DIMENSIONAL DEPICTION OF COMPONENTS OF A FILM EXTRUSION SYSTEM ON AN OUTPUT DEVICE

This is a nationalization of PCT/EP03/009632 filed Aug. 28, 2003 and published in German.

BACKGROUND OF THE INVENTION

1. Field of the Invention

The invention concerns an operator panel for film extrusion plants.

2. Description of the Prior Art

Flat film and blown film extrusion plants are known sufficiently. Such a plant is illustrated in e.g. EP 0 873 846. Usually these plants are controlled by an operating panel. These operating panels usually contain at least the following functional elements:

an input terminal at which functional parameters of the film extrusion plants can be set.

An indicator device on which the extrusion plant and the associated extruders and likewise their operating parameters are displayed.

The operating panels are mounted at an accessible part in the immediate surroundings of the extruder. The operating panel is surrounded by extruders particularly in blown film extrusion plants where the extruders are arranged all around the extrusion plant.

The extrusion plant is usually displayed as a sketch. However in known equipment the display conforms not to the actual arrangement of the extruders around the extrusion nozzle, but instead, the display is in accordance with other standpoints. Most frequently one comes across an arrangement of the extruders according to their numbering. Here the extruders are sketched as if are they arranged in a line.

However it is common to all known display types that the extruders are not arranged according to their actual arrangement around the extrusion nozzle and/or the blowing head. This factor leads to difficulties particularly in the case of blown film extrusion plants.

Machine operators who sit at an operating panel of the extrusion plant wherein the operating panel is adjoining the blowing head or—in the case of flat film extrusion—adjoining the nozzle, do not know whether the extruders are displayed on the operating panel in the correct order or whether they are laterally reversed. For these reasons the machine operators must repeatedly ascertain the numbers of the individual extruders.

SUMMARY OF THE INVENTION

There are similar problems in the allocation of other machine elements such as the operating panel itself or the winding positions.

Therefore the aim of the present invention is to suggest an operating panel that makes it easier for the machine operator to identify these machine elements in the display on the operating panel. This task is solved by the fact that The indicator device can display the at least two-dimensional alignment of elements of the extrusion plant such as extruders or winding positions to the blowing head or the film bubble.

The invention can be used both in flat film extrusion plants and also in blown film extrusion plants. The term "nozzle" as used herein thus includes a flat die and also a blowing head.

By an operating panel in accordance with the invention the machine operator gets the chance to identify and relate better to his own spatial position in the extrusion plant.

Further design forms of the invention are based on the graphic description and the claims.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
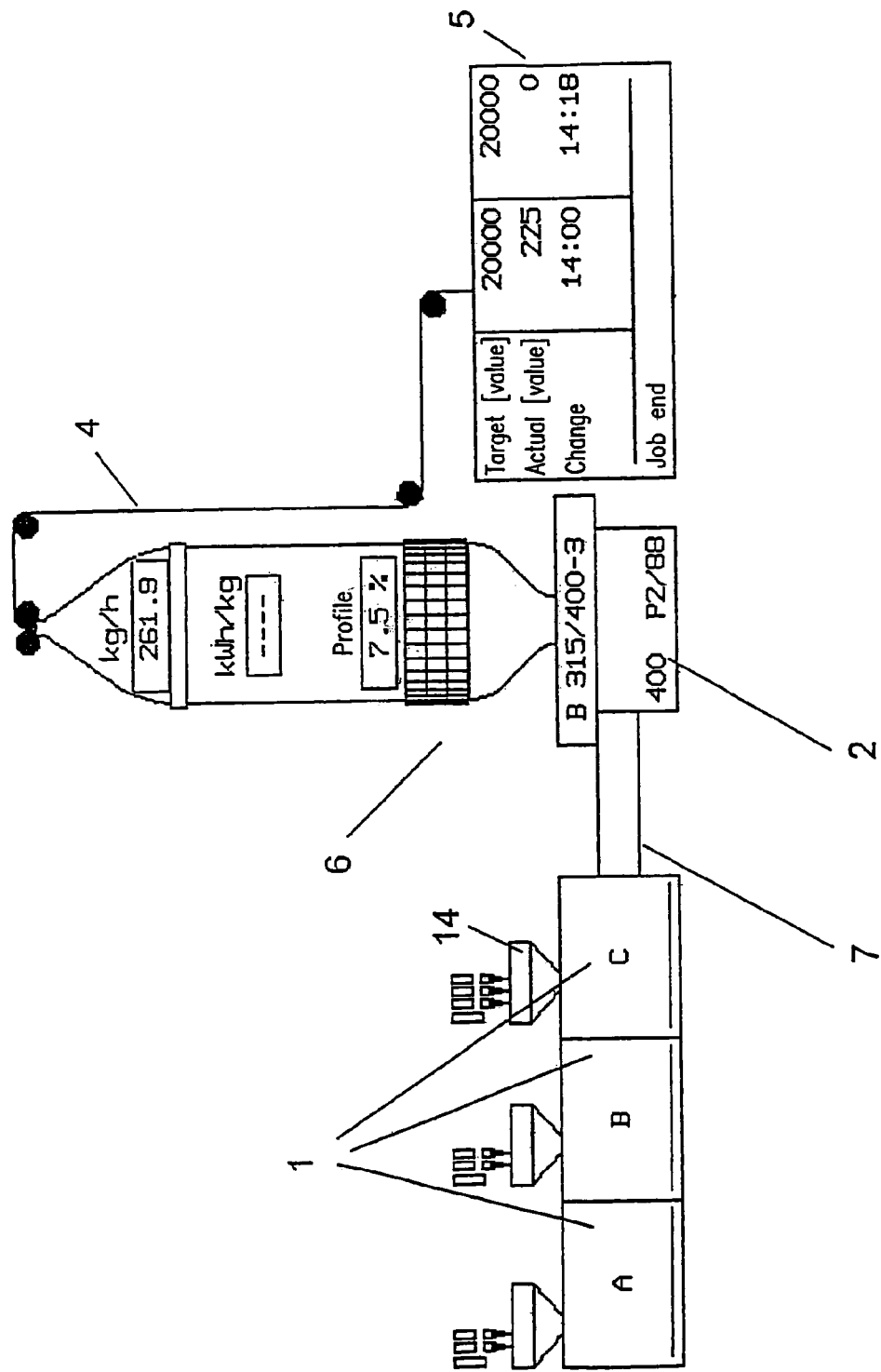
FIG. 1 An illustration of a blown film extrusion plant in accordance with prior art.

FIG. 1 illustrates a view of a known indicator device. The extruders 1 are numbered serially with the letters A, B, C and illustrated as if they are arranged in one line. Thus though the outlines of the extruders 1 are illustrated two-dimensionally, their alignment to the blowing head 2 and/or the film bubble 1 is in a one-dimensional line, which is also illustrated near the blowing head, scaled down and thus falsified. Thus the allocation of the extruders is made difficult for the operator. Besides the extruders 1, the melt feed line 7, the blowing head 2 the film bubble 2 and the squeezed film 4 are displayed in sketched form on the indicator 3. Within the outlines of a part of these elements 2, 3 of the extrusion plant, dimensions and measured values are displayed relating to the operating parameters or the other characteristics of the respective elements 2, 3. At the place where actually a winding equipment assigned to the extrusion plant should have been illustrated only a rectangular display panel 5 is provided. Dimensions and measured values referring to a winding equipment are displayed in this display panel 5.

Figure 2:
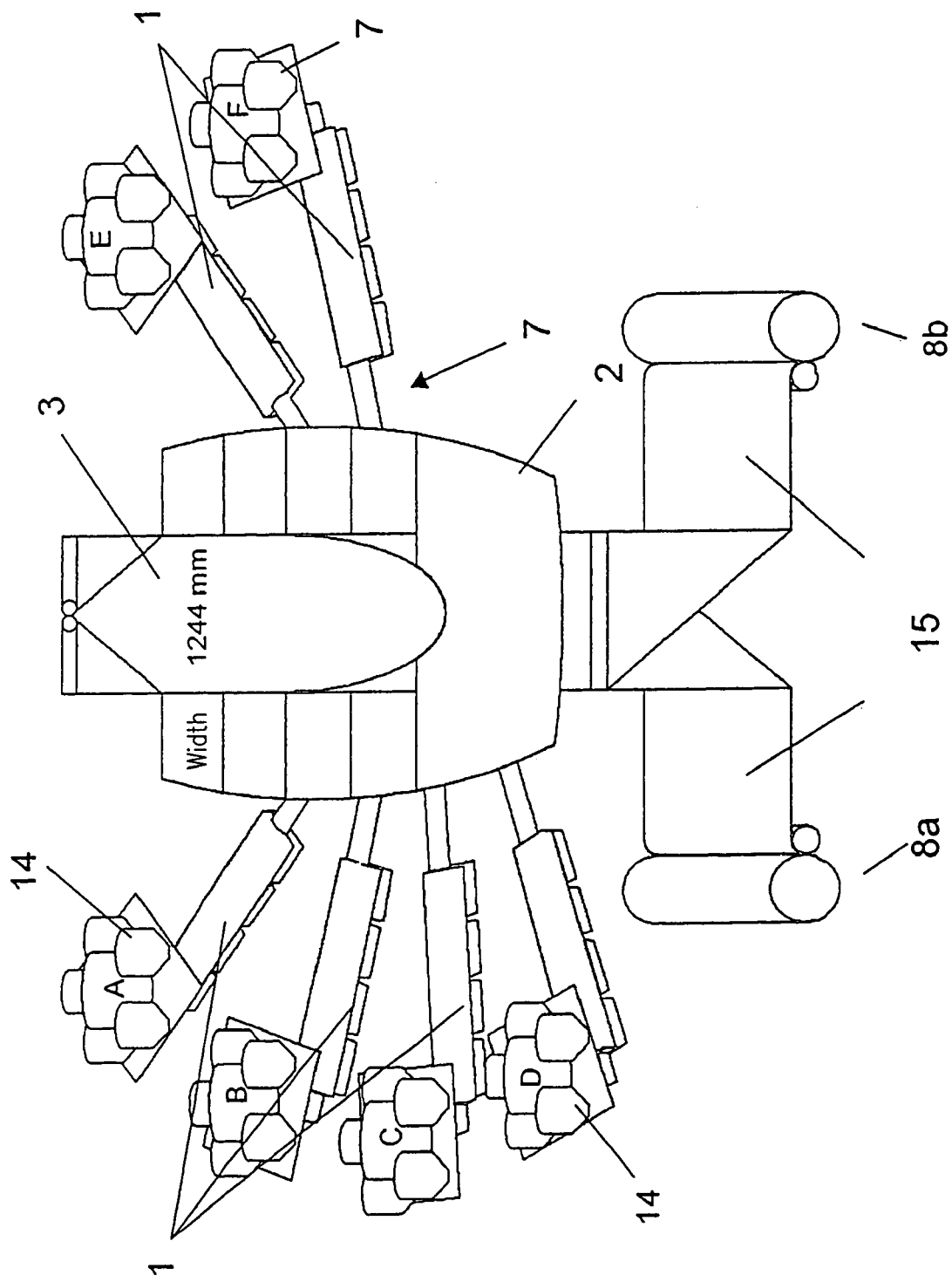
FIG. 2 A representation of a blown film extrusion plant on an indicator device of an operating panel in accordance with the invention.

FIG. 2 illustrates a view of an indicator of an operating panel in accordance with the invention. The extruders 1 that are numbered again with capital letters are displayed as per their two-dimensional arrangement around blowing head 2 and film bubble 3. Both the last-mentioned elements and the winding positions 8*a* and b (sketched for the first time) that are also numbered with the capital letters A and B show within their—or in the case of the film bubble 3 directly near their—contours dimensions and measured values referring to their physical characteristics or operating parameters. Thus both extruders 1 and also the winding positions are displayed as per their two-dimensional alignment to the extrusion plant. It is worthy of mention that the extruders 1 in FIG. 2 are illustrated in the form of a perspective top view; while the film bubble 2 is illustrated in front view.

Figure 3:
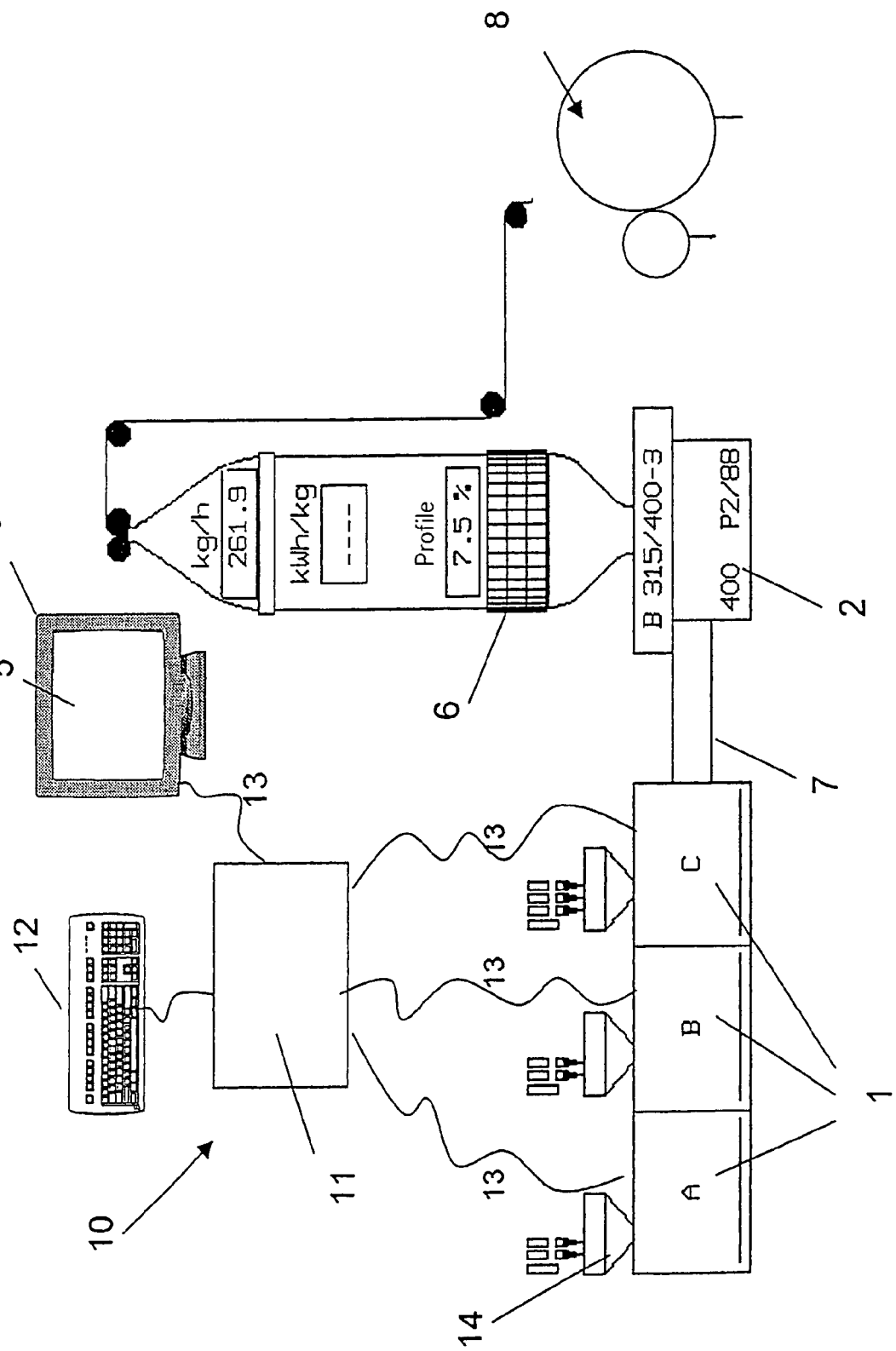
FIG. 3 A sketch of a blown film extrusion plant with an operating panel.

FIG. 3 is the sketch of an extrusion plant that contains besides the machine elements 1 to 8 already illustrated in the figures, also an operating panel 10 that contains at least one indicator 9 that is illustrated here as a monitor, a control and/or calculating device 11 and a keyboard 12. The control of the machine elements 1–8 takes place via control lines 13.

The keyboard 12 is accorded the role of an input terminal. However the term input terminal also includes other data input means such as touch-screens or speech recognition programs.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

| List of reference symbols | |
|---|---|
| 1 | Extruder |
| 2 | Blowing head/nozzle |
| 3 | Film bubble |
| 4 | Squeezed film |
| 5 | Display panel |
| 6 | air ring |
| 7 | Melt feed line |
| 8 | a) winding section |
|   | b) winding section |
| 9 | Indicator |
| 10 | Operating panel |
| 11 | Calculating device |
| 12 | Keyboard/input terminal |
| 13 | Control lines |
| 14 | Resin hopper |
| 15 | Already cut sheets |
| 16 | |
| 17 | |
| 18 | |
| 19 | |
| 20 | |
| 21 | |
| 22 | |
| 23 | |
| 24 | |

What is claimed is:

1. An operating panel for a film extrusion plant, comprising:
    an input terminal at which functional parameters of the film extrusion plant can be set; and
    an indicator device on which elements of the film extrusion plant are illustrated and, where necessary, their operating parameters are indicated, the elements being extruders, a film bubble, a nozzle, or winding positions to a blowing head, such that alignment of the elements of the extrusion plant can be displayed on the indicator device at least partly and at least two-dimensionally.

2. The operating panel in accordance with claim 1 wherein the nozzle and/or the film bubble can be displayed in a center of the two-dimensional arrangement of the extruders.

3. The operating panel in accordance with claim 1 wherein the at least two-dimensional arrangement of the elements of the extrusion plant can be displayed at least partly in a top view.

4. The operating panel in accordance with claim 1 wherein the at least two-dimensional arrangement of the elements of the extrusion plant can be displayed at least partly in a perspective top view.

5. The operating panel in accordance with claim 1 wherein the nozzle and/or the film bubble can be displayed in a front view.

6. The operating panel in accordance with claim 1 wherein the winding positions can be displayed below the arrangement of the extruders.

7. The operating panel in accordance with claim 1, wherein the indicator device can graphically illustrate a two-dimensional arrangement of resin hoppers and/or dosimetry units associated with the extruders.

8. The operating panel in accordance with claim 1 wherein the elements of the extrusion plant displayed on the indicator device whose functional parameters lie outside a target range are highlighted on the indicator device.

9. The operating panel according to claim 1 wherein the elements of the extrusion plant whose functional parameters lie outside a target range are highlighted in red color.

10. The operating panel in accordance with claim 1 wherein the operating panel is illustrated according to its actual alignment to the film bubble and/or the blowing head between adjoining elements of the extrusion plant.

11. A process for the operation and/or monitoring of a film extrusion plant, comprising:
    operating and/or monitoring the plant with an operating panel that contains an indicator device,on which elements of the film extrusion plant are displayed and if necessary their operating parameters are indicated, the elements being extruders, a film bubble, a nozzle, or winding positions to a blowing head,
    such that arrangement and alignment of the elements of the extrusion plant are displayed at least partly and at least two-dimensionally.

12. An operating panel for a film extrusion plant, comprising:
    a terminal for inputting functional parameters of operating elements of the plant; and
    an indicator for displaying the elements and their functional parameters, the elements being an extruder, a film bubble, a nozzle, a blowing head, a winding section, or a resin hopper or dosimetry unit associated with the extruder, the indicator displaying at least two-dimensionally a spatial relationship of the elements.

13. The operating panel according to claim 12, wherein the display of the elements is a front view, a top view, or a perspective top view.

14. The operating panel according to claim 12, wherein the indicator displays as a highlighted display a value of the functional parameter that is outside a target range.

15. The operating panel according to claim 12, wherein the indicator displays at least two-dimensionally a spatial relationship between the operating elements and an operator viewing the display.

* * * * *